Aug. 7, 1928.
P. W. LEHMAN
1,680,222
BALE SPLITTER
Filed July 21, 1927
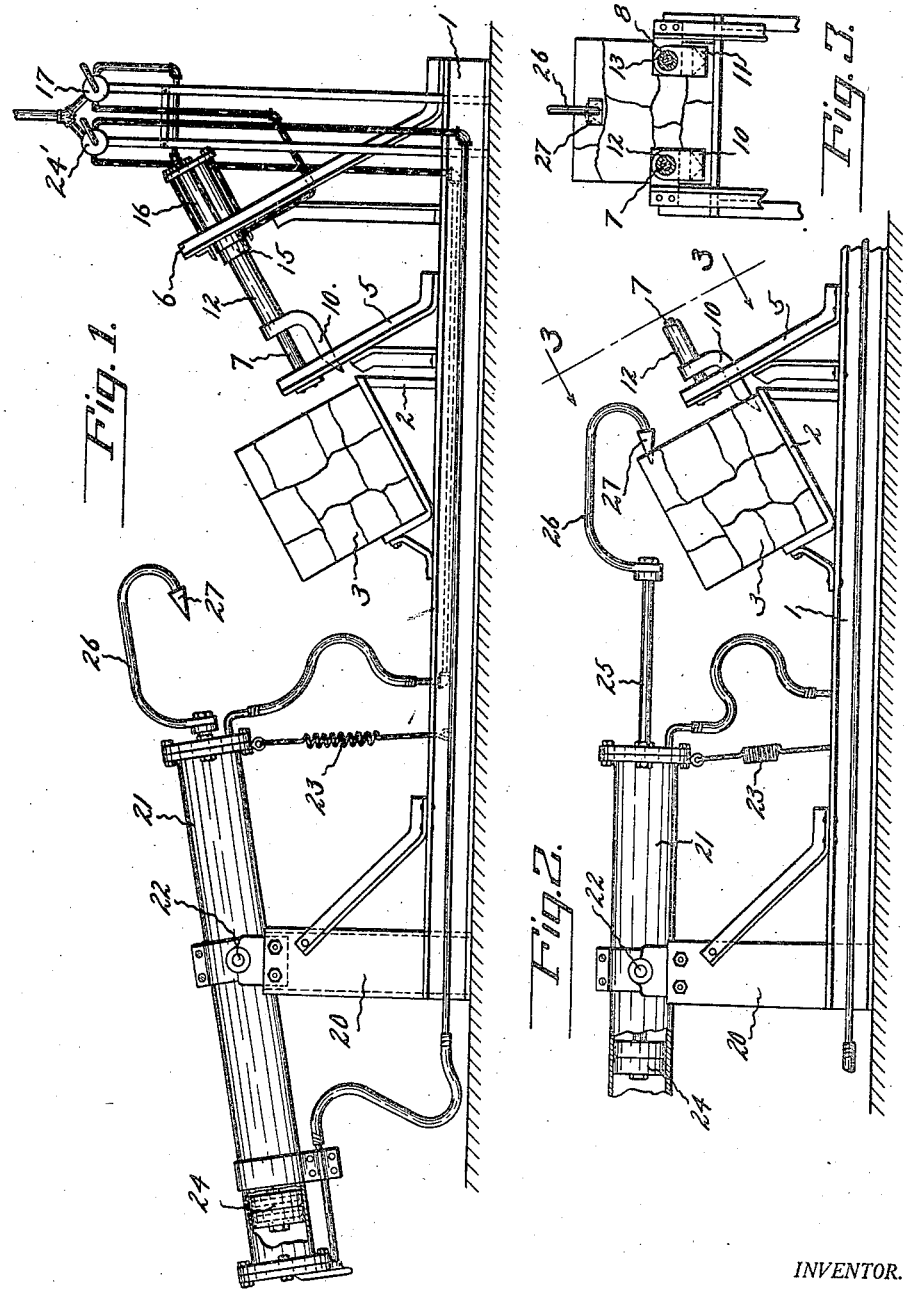
INVENTOR.
PAUL W. LEHMAN.
BY
ATTORNEY.

Patented Aug. 7, 1928.

1,680,222

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

BALE SPLITTER.

Application filed July 21, 1927. Serial No. 207,546.

This invention relates to a device for breaking or splitting bales of material such as rubber, and has for its object the provision of a device which will break or split a bale of rubber into pieces suitable for further handling. Other and further objects will be apparent from the following specification and claims. In the accompanying drawings which illustrate one embodiment of the invention, Fig. 1 is a side elevation of the machine in inoperative position;

Fig. 2 is a similar view with the parts in the position to break or split the bale; and Fig. 3 is a section substantially on line 3—3 of Fig. 2.

Referring to the drawings, the base of the machine is shown as 1 at one end of which is positioned an inclined support 2 to receive a bale of rubber 3. Adjacent support 2 are inclined frames 5 and 6 to which are secured guide rods 7 and 8. Bale holding spikes 10 and 11 are secured to cylindrical members 12 and 13 which slide on rods 7 and 8, members 12 and 13 being secured to a cross head 15 operatively connected to the piston of an air cylinder 16, the latter controlled from a two-way valve 17 in a well known manner. At the opposite end of frame 1 is secured a standard 20 upon which is pivoted at 22 an air cylinder 21. The normal position of cylinder 21 is shown in Fig. 1, the cylinder being nearly counterbalanced by a spring 23. The piston 24 of the air cylinder 21 is operated from a valve 24. The piston rod 25 is provided at its end with a hook 26 having a bale engaging point 27.

The operation is as follows:

With the parts in the position shown in Fig. 1, a bale of rubber 3 is positioned on support 2. Air is then admitted to cylinder 16 to force the spikes 10 and 11 into the lower portion of the bale as shown in Fig. 2. Air is then admitted into cylinder 21 to project the hook 25 beyond the bale 3. The cylinder is then tilted downwardly into a horizontal position and the valve 24' slowly opened to force the point 26 into the upper portion of the bale. Valve 24 is then completely opened to draw hook 25 backwardly thereby breaking or splitting off the top portion or layers of the bale of rubber 3, the lower portion of the bale being held by spikes 10 and 11. The size of the piece torn from the bale is determined by the initial position of the point 26 and it will be understood that successive pieces of desired size may be torn from the bale until the bottom portion held by spikes 10 and 11 is reached.

Having thus described my invention, I claim:

1. A device of the character described comprising means to support a bale of rubber at an angle to the horizontal, holding means engaging the lower portion of the bale, and means adapted to engage the upper portion of the bale and movable in a substantially horizontal direction to split the upper portion of the bale from the lower portion.

2. A device of the character described comprising means to support a bale of rubber at an angle to the horizontal, spikes adapted to be inserted in the lower portion of the bale to hold the latter, a hook member adapted to engage the upper portion of the bale and means to move the hook member in a substantially horizontal direction to split the upper portion of the bale from the lower portion.

3. A device of the character described comprising a pivotally supported fluid pressure cylinder, a hook secured to the piston rod thereof, a support positioned in line with the cylinder and in the path of travel of the hook adapted to support a bale of rubber inclined toward the hook, a pair of spikes carried by the piston of a second fluid pressure cylinder and reciprocable in a plane substantially parallel to the base of the bale, said spikes adapted to engage the lower portion of the bale on the side remote from the first named air cylinder, and valves to control the respective operations of the air cylinders.

PAUL W. LEHMAN.